United States Patent
Kamimura

(10) Patent No.: US 9,798,475 B2
(45) Date of Patent: Oct. 24, 2017

(54) MEMORY SYSTEM AND METHOD OF CONTROLLING NONVOLATILE MEMORY

(71) Applicant: Toshiba Memory Corporation, Minato-ku (JP)

(72) Inventor: Naoya Kamimura, Yokohama (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 1 day.

(21) Appl. No.: 14/840,321

(22) Filed: Aug. 31, 2015

(65) Prior Publication Data
US 2016/0266817 A1    Sep. 15, 2016

Related U.S. Application Data

(60) Provisional application No. 62/131,598, filed on Mar. 11, 2015.

(51) Int. Cl.
G06F 3/06    (2006.01)

(52) U.S. Cl.
CPC .......... G06F 3/0616 (2013.01); G06F 3/0619 (2013.01); G06F 3/0653 (2013.01); G06F 3/0679 (2013.01)

(58) Field of Classification Search
CPC .................................................. G06F 12/0246
See application file for complete search history.

(56) References Cited

U.S. PATENT DOCUMENTS

| 6,058,047 A | 5/2000 | Kikuchi |
| 7,512,847 B2 | 3/2009 | Bychkov et al. |
| 8,000,927 B2 | 8/2011 | Sukegawa |
| 2012/0278533 A1 | 11/2012 | Suzuki et al. |
| 2015/0026389 A1* | 1/2015 | Li ...................... G06F 12/0246 711/103 |
| 2016/0162352 A1* | 6/2016 | Singhai ............... G06F 11/1008 714/773 |

* cited by examiner

*Primary Examiner* — Adam M Queler
*Assistant Examiner* — Edmund Kwong
(74) *Attorney, Agent, or Firm* — Oblon, McClelland, Maier & Neustadt, L.L.P.

(57) ABSTRACT

According to one embodiment, a controller writes data stored in a first data group of a plurality of data groups into a first block group of the plurality of block groups and writes data stored in a second data group of the plurality of data groups into a second block group of the plurality of block groups in a case where a first condition is satisfied.

16 Claims, 13 Drawing Sheets

FIG.6

| LOGICAL ADDRESS | ACCUMULATE NUMBER OF TIMES OF READING:Nrd |
|---|---|
| ADDRESS N | |
| ⋮ | ⋮ |
| ADDRESS M | |

FIG.7

| BLOCK ID | MAXIMUM NUMBER OF ERROR BITS Nmbker |
|---|---|
| | |
| ⋮ | ⋮ |

MEMORY SYSTEM AND METHOD OF CONTROLLING NONVOLATILE MEMORY

CROSS-REFERENCE TO RELATED APPLICATIONS

This application is based upon and claims the benefit of priority from U.S. Provisional Application No. 62/131,598, filed on Mar. 11, 2015; the entire contents of which are incorporated herein by reference.

FIELD

Embodiments described herein relate generally to a memory system including a nonvolatile memory and a method of controlling a nonvolatile memory.

BACKGROUND

Due to a physical structure, a semiconductor memory such as a NAND type flash memory is worn and reaches the end of its life at a predetermined number of times of rewriting. In such a semiconductor memory, in order to lengthen the life, a wear leveling process for leveling the degree of wear among blocks is performed. In wear leveling control, for example, data is exchanged between a block having a small number of times of rewriting (the number of times of erasing) and a block having a large number of times of rewriting.

The tolerance of each memory cell to rewriting has a variation between packages, chips, and blocks, and data retention with higher reliability is requested.

BRIEF DESCRIPTION OF THE DRAWINGS

FIG. 6 is a diagram that illustrates an accumulated number of times of reading management table;

FIG. 7 is a diagram that illustrates a maximum number of error bits management table;

DETAILED DESCRIPTION

In general, according to one embodiment, a memory system includes a nonvolatile memory and a controller. The nonvolatile memory includes a plurality of blocks. The controller groups the plurality of blocks into a plurality of block groups based on a first value. The first value corresponds to a degree of wear of each of the blocks. The controller groups data stored in the nonvolatile memory into a plurality of data groups based on a second value. The second value corresponds to an access frequency or the number of access times for the data from a host. The controller writes data stored in a first data group of the plurality of data groups into a first block group of the plurality of block groups and writes data stored in a second data group of the plurality of data groups into a second block group of the plurality of block groups in a case where a first condition is satisfied.

Exemplary embodiments of a memory system and a method of controlling a nonvolatile memory will be explained below in detail with reference to the accompanying drawings. The present invention is not limited to the following embodiments.

First Embodiment

Figure 1:
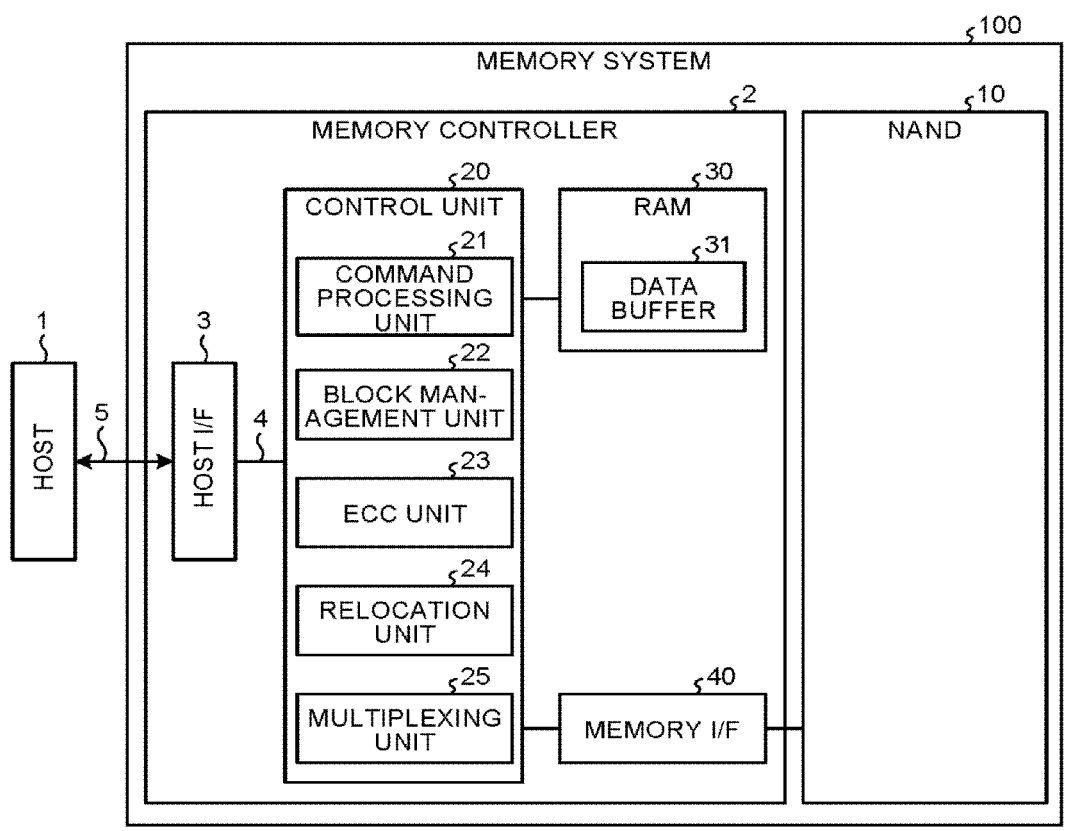
FIG. 1 is a functional block diagram that illustrates an example of the internal configuration of a memory system.

FIG. 1 is a block diagram that illustrates an example of the configuration of a memory system 100 according to a first embodiment. The memory system 100 is connected to a host apparatus (hereinafter, abbreviated as a host) through a communication line 5 and functions as an external storage device of the host 1. The host 1, for example, may be an information processing apparatus such as a personal computer, a mobile phone, an imaging apparatus, a mobile terminal such as a tablet computer or a smartphone, a gaming device, or an in-vehicle terminal such as a car navigation system.

The memory system 100 includes: a NAND type flash memory (hereinafter, abbreviated as a NAND) 10 as a nonvolatile memory; and a memory controller 2. The nonvolatile memory is not limited to the NAND type flash memory but may be a flash memory having a three-dimensional structure, a magnetoresistive random access memory (MRAM), a resistance random access memory (ReRAM), a ferroelectric random access memory (FeRAM), or the like.

The NAND 10 includes one or more memory chips each including a memory cell array. The memory cell array includes a plurality of memory cells arranged in a matrix pattern. The memory cell array includes a plurality of blocks that are units for data erasing. Each block is configured by a plurality of physical sectors.

Figure 2:
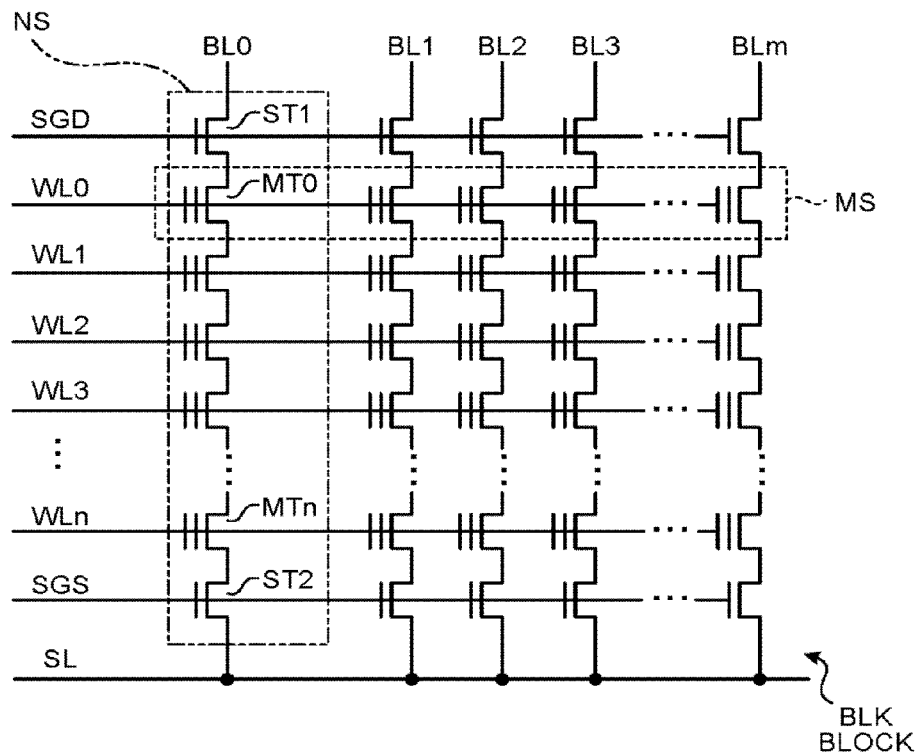
FIG. 2 is a diagram that illustrates an example of the circuit configuration of a memory cell array.

FIG. 2 is a diagram that illustrates an example of the configuration of a block of the memory cell array. FIG. 2 illustrates one of a plurality of blocks that configure the memory cell array. The other blocks of the memory cell array have the same configuration as that illustrated in FIG. 2. As illustrated in FIG. 2, the block BLK of the memory cell array includes (m+1) (here, m is an integer of zero or more) NAND strings NS. Each NAND string NS shares a diffusion region (a source region or a drain region) between memory cell transistors MT adjacent to each other. Each NAND string NS includes: (n+1) (here, n is an integer of zero or more) memory cell transistors MT0 to MTn connected in series; and selection transistors ST1 and ST2 arranged at both ends of the column of the (n+1) memory cell transistors MT0 to MTn.

Word lines WL0 to WLn are respectively connected to control gate electrodes of the memory cell transistors MT0 to MTn that configure the NAND string NS, and, memory cell transistors MTi (here, i=0 to n) included in each NAND string NS are connected to be common using the same word line WLi (here, i=0 to n). In other words, the control gate electrodes of the memory cell transistors MTi disposed in the same row within the block BLK are connected to the same word line WLi.

Each of the memory cell transistors MT0 to MTn is configured by a field effect transistor having a stacked gate structure on a semiconductor substrate. Here, the stacked gate structure includes: a charge storage layer (floating gate electrode) formed on the semiconductor substrate with a gate insulating film being interposed therebetween; and a control gate electrode formed on the charge storage layer with an inter-gate insulating film being interposed therebetween. A threshold voltage of each of the memory cell transistors MT0 to MTn changes according to the number of electrons storable in the floating gate electrode and thus, can store data according to a difference in the threshold voltage.

Bit lines BL0 to BLm are respectively connected to the drains of (m+1) selection transistors ST1 within one block BLK, and a selection gate line SGD is commonly connected to the gates of the selection transistors. In addition, the source of the selection transistor ST1 is connected to the drain of the memory cell transistor MT0. Similarly, a source line SL is commonly connected to the sources of the (m+1) selection transistors ST2 within one block BLK, and a selection gate line SGS is commonly connected to the gates of the selection transistors. In addition, the drain of the selection transistor ST2 is connected to the source of the memory cell transistor MTn.

Each memory cell is connected to the word line and connected to the bit line. Each memory cell can be identified by using an address used for identifying a word line and an address used for identifying a bit line. As described above, the data of the plurality of memory cells (the memory cell transistors MT) disposed within the same block BLK is erased altogether. On the other hand, data is written and read in units of physical sectors MS. One physical sector MS includes a plurality of memory cells connected to one word line.

Each memory cell can perform multi-value storage. In a case where the memory cells are operated in a single level cell (SLC) mode, one physical sector MS corresponds to one page. On the other hand, in a case where the memory cells are operated in a multiple level cell (MLC) mode, one physical sector MS corresponds to N pages (here, N is a natural number of two or more).

In a read operation and a program operation, one word line is selected and one physical sector MS is selected according to the physical address. A page switching within this physical sector MS is performed using the physical address.

User data transmitted from the host 1 and management information and firmware of the memory system 100 are stored in the NAND 10. The firmware operates a CPU (not illustrated in the figure) realizing at least some of the functions of a control unit 20 of the memory controller 2. The firmware described above may be stored in a ROM not illustrated. The management information described above includes a logical/physical translation table, a block management table, and the like.

The memory controller 2 includes: a host interface 3; a memory interface 40; a RAM 30; and a control unit 20. In this embodiment, while the RAM 30 is arranged inside the memory controller 2, the RAM 30 may be disposed outside the memory controller 2. The host I/F 3 outputs a command, user data (write data), and the like received from the host 1 to an internal bus 4. In addition, the host I/F 3 transmits user data read from the NAND 10, a response from the control unit 20, and the like to the host 1. As the host I/F 3, serial advanced technology attachment (SATA), PCIe (PCI express), serial attached SCSI (SAS), or the like is used. The memory I/F 40 directly controls the NAND 10 based on an instruction from the control unit 20.

The RAM 30 is a volatile semiconductor memory that can be accessed at a speed higher than that of the NAND 10. The RAM 30 includes a storage area as a data buffer 31. The data buffer 31 temporarily stores data received from the host 1 before writing the data into the NAND 10 or temporarily stores data read from the NAND 10 before transmitting the data to the host 1. The management information stored in the NAND 10 is loaded into the RAM 30. The management information loaded into the RAM 30 is backed up in the NAND 10. The RAM 30 serves also as a buffer in which firmware stored in the NAND 10 is loaded. As the RAM 30, a static random access memory (SRAM) or a dynamic random access memory (DRAM) is used.

The control unit 20 includes: a command processing unit 21; a block management unit 22, an ECC unit 23; a relocation unit 24; and a multiplexing unit 25. The function of the control unit 20 is realized by one or a plurality of CPUs (processors) executing the firmware loaded in the RAM 30 and peripheral circuits thereof. The function of the command processing unit 21 is realized by the CPU executing the firmware and/or hardware. The function of the block management unit 22 is realized by the CPU executing the firmware and/or hardware. The function of the ECC unit 23 is realized by the CPU executing the firmware and/or hardware. The function of the relocation unit 24 is realized by the CPU executing the firmware and/or hardware. The function of the multiplexing unit 25 is realized by the CPU executing the firmware and/or hardware.

The command processing unit 21 performs a process according to a command received from the host 1. A read command includes a read address. A write command includes a write address and write data. For example, in a case where a write request is received from the host 1, the command processing unit 21 temporarily stores the write data in the data buffer 31. The command processing unit 21, for example, when the data buffer 31 is filled with data, reads data stored in the data buffer and writes the read data into the NAND 10 through the ECC unit 23 and the memory I/F 40.

In addition, when a read request is received from the host 1, the command processing unit 21 instructs the memory I/F 40 to read data from the NAND 10. The memory I/F 40 temporarily stores the data read from the NAND 10 in the data buffer 31 through the ECC unit 23. The command processing unit 21 transmits the read data stored in the data buffer 31 to the host 1 through the host I/F 3.

The command processing unit 21 manages the user data by using the logical/physical translation table that is one of the above-described management information loaded in the RAM 30. In the logical/physical translation table, mapping associating a logical address used by the host 1 and a physical address of the NAND 10 with each other is registered. For the logical address, for example, logical block addressing (LBA) is used. The physical address represents a storage position on the NAND 10 in which data is stored.

When a read command is received from the host 1, the command processing unit 21 notifies the relocation unit 24 of the read command.

The block management unit 22 manages blocks included in the NAND 10 by using the block management table that is one of the above-described management information loaded in the RAM 30. In the block management table, for example, the following block management information is managed.

(a) Number of times of erasing executed in units of blocks (b) Information used for identifying whether a block is either an active block or a free block (c) Block addresses of bad blocks An active block is a block in which valid data is recorded. A free block is a block that has no valid data being recorded therein and can be reused by erasing data. The valid data is data that is associated with a logical address, and invalid data is data that is not associated with a logical address. After data is erased in a free block, the free block is used as an active block. A bad block is an unusable block that does not normally operate due to various factors.

The ECC unit 23 codes user data buffered in the data buffer 31 under the control of the command processing unit 21, thereby generating a code word including data and a redundant section (parity). As an error correction code (ECC), any code may be used, and, for example, a BCH code, a Reed-Solomon (RS) code, or the like may be used. The ECC unit 23 inputs the generated code word to the memory I/F 40. The ECC unit 23 acquires a code word, which is read from the NAND 10, from the memory I/F 40 and decodes the acquired code word. The ECC unit 23 inputs the decoded data to the data buffer 31. The ECC unit 23 notifies the relocation unit 24 of the number of error bits Npger of each page read from the NAND 10.

The ECC unit 23 includes a plurality of ECC sections having mutually-different error correction capabilities. For example, the ECC unit 23 includes a first-level ECC section, a second-level ECC section, and a third-level ECC section having mutually-different error correction capabilities. In order to configure the error correction capabilities to be different from each other, for example, the size of data configuring the code word and/or a coding system are changed. The second-level ECC section has an error correction capability higher than that of the first-level ECC section, and the third-level ECC section has an error correction capability higher than that of the second-level ECC section. Accordingly, in a case where an error correction is failed by the first-level ECC section, the second-level ECC section executes the error correction, and, in a case where an error correction is failed by the second-level ECC section, the error correction is executed by the third-level ECC section.

The relocation unit 24 groups user data stored in the NAND 10 into a plurality of data groups based on an access frequency or the number of access times from the host 1 and groups a plurality of blocks (active blocks and free blocks) inside the NAND 10 into a plurality of block groups according to the degrees of wear (reliability) of the blocks. The access frequency is a value that represents the frequency at which the access occurs. The access frequency, for example, may be the number of access times per unit time or an accumulated access times that has been accumulated from specific time. The relocation unit 24 executes a data relocating process in which data grouped into a data group having a high access frequency is rewritten into a block grouped into a block group having a low degree of wear, and data grouped into a data group having a low access frequency is rewritten into a block group grouped into a block group having a high degree of wear. In other words, the relocation unit 24 rewrites data grouped into a data group having a highest access frequency into a block grouped into a block group having the lowest degree of wear and rewrites data grouped into another data group having an access frequency lower than the data group having the highest access frequency into a block grouped into a block group other than the group having the lowest degree of wear.

Figure 3:
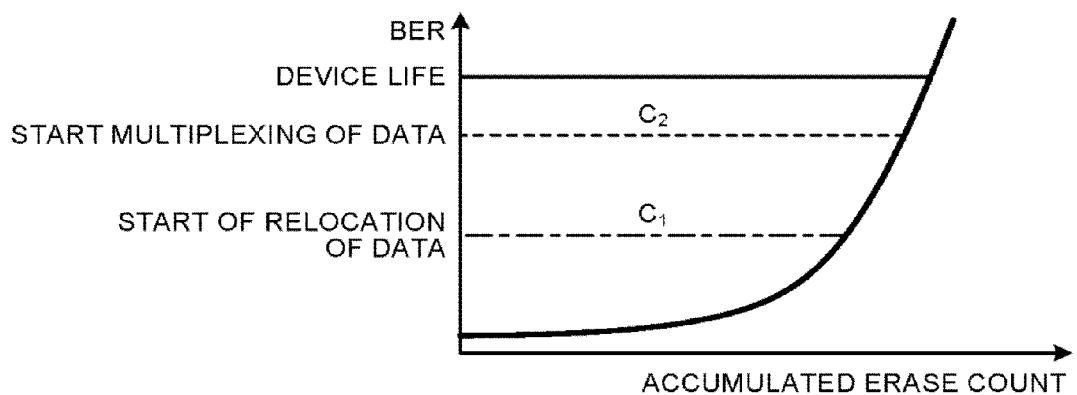
FIG. 3 is a diagram that illustrates a relation between an accumulated erase count and a bit error rate of a NAND.

This data relocating process is started when the wear of the memory system 100 advances to some degree. FIG. 3 is a diagram that illustrates a relation between the accumulated number of times of erasing data (hereinafter, referred to as an accumulated erase count) and a bit error rate (BER) of the NAND 10. The accumulated erase count is a total number of times of erase of all the blocks of the NAND 10. Instead of the accumulated erase count, a time may be used. The BER is one of measures of the degree of wear of the NAND 10. The BER, for example, is calculated as an average BER of all the blocks arranged inside the NAND 10. As illustrated in FIG. 3, the BER increases according to an increase in the accumulated erase count. In the case illustrated in FIG. 3, the data relocating process is started in a case where the BER of the NAND 10 exceeds a threshold C1. A threshold C2 is used for determining the start of a multiplexing process to be described in a second embodiment.

Figure 4:
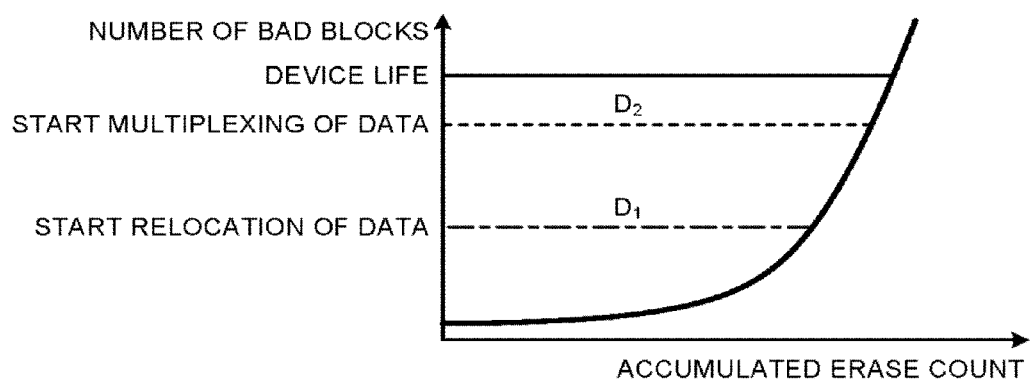
FIG. 4 is a diagram that illustrates a relation between an accumulated erase count and the number of bad blocks.

FIG. 4 is a diagram that illustrates a relation between an accumulated erase count and the number of bad blocks. As illustrated in FIG. 4, the number of bad blocks increases according to an increase in the accumulated erase count. In the case illustrated in FIG. 4, in order to determine the degree of wear of the NAND 10, the number of bad blocks is used. In the case illustrated in FIG. 4, the data relocating process is started in a case where the number of bad blocks exceeds a threshold D1. A threshold D2 is used for determining the start of the multiplexing process to be described in the second embodiment.

Figure 5:
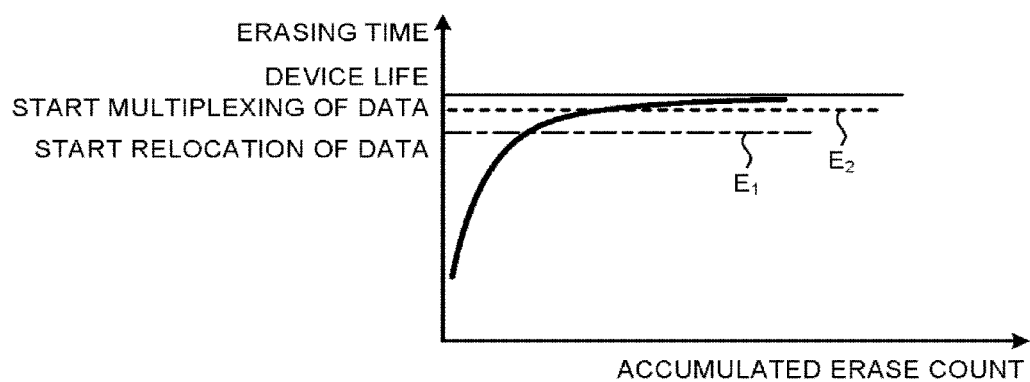
FIG. 5 is diagram that illustrates a relation between an accumulated erase count and an erasing time.

FIG. 5 is a diagram that illustrates a relation between an accumulated erase count and an erasing time. The erasing time is a time required for a block erasing process and, for example, is an average of erasing times of all the blocks. As illustrated in FIG. 5, the erasing time increases according to an increase in the accumulated erase count. In the case illustrated in FIG. 5, in order to determine the degree of wear of the NAND 10, the erasing time is used. In the case illustrated in FIG. 5, the data relocating process is started in a case where the erasing time exceeds a threshold E1. A threshold E2 is used for determining the start of the multiplexing process to be described in the second embodiment.

In order to manage the access frequency (or the number of access times) of the user data stored in the NAND 10, the relocation unit 24 manages a relation between a logical address (LBA) of data and the accumulated number Nrd of times of reading. FIG. 6 is a diagram that illustrates an accumulated number of times of reading management table (hereinafter, referred to as an Nrd management table). The Nrd management table is one of the management information described above and is loaded into the RAM 30 from the NAND 10. As described above, when a read command is received, the command processing unit 21 notifies the relocation unit 24 of the received read command. The relocation unit 24 counts up the Nrd value of an entry corresponding to the LBA specified by the read command in the Nrd management table based on the notified read command.

In addition, in order to manage the degree of wear of each block arranged inside the NAND 10, the relocation unit 24 manages a relation between a block ID of each block arranged inside the NAND and a maximum number of error bits Nmbker. Here, blocks of which the degrees of wear are managed are blocks acquired by excluding bad blocks from all the blocks that are accessible from the host 1. In other words, the blocks of which the degrees of wear are managed are free blocks and active blocks. FIG. 7 illustrates a maximum number of error bits management table (hereinafter, referred to as an Nmbker management table). The Nmbker management table is one of the management information described above and is load from the NAND 10 into the RAM 30. As described above, the ECC unit 23 notifies the relocation unit 24 of the number of error bits Npger of each page read from the NAND 10. The relocation unit 24 calculates the maximum number of error bits Nmbker of each block ID based on the number of error bits Npger of each page and registers and updates a result of the calculation in the Nmbker management table.

The number of error bits Nbker of each block is calculated based on the number of error bits Npger of one or a plurality of pages included in the block. The number of error bits Npger of a page is the number of error bits generated in data written into the page, and a notification thereof is given from the ECC unit 23. In order to calculate the number of error bits Nbker of a block, the number of error bits Npger of all the pages included in the block may be acquired. In addition, the number of error bits Nbker of a block may be calculated based on the number of error bits Npger of one or a plurality of specific pages selected as a sample target in advance. For example, it may be configured such that the number of error bits Npger of a plurality of pages that are sample targets are acquired, and an average value or a maximum value thereof is set as the number of error bits Nbker of the block.

A maximum value of the number of error bits Nbker of each block acquired in this way within a predetermined period is the maximum number of error bits Nmbker of the block. When the number of error bits Nbker' of a block A is calculated, the relocation unit 24 compares the number of error bits Nbker' calculated this time with the number of error bits Nmbker registered in the entry of the block A in the Nmbker management table. Then, in a case where the number of error bits Nbker' of this time is larger than the registered number of error bits Nmbker, the relocation unit 24 updates the entry of the block A with the number of error bits Nbker' of this time.

The multiplexing unit 25 executes the multiplexing process of user data that is stored inside the NAND 10. The multiplexing process will be described in detail in the second embodiment.

Figure 8:
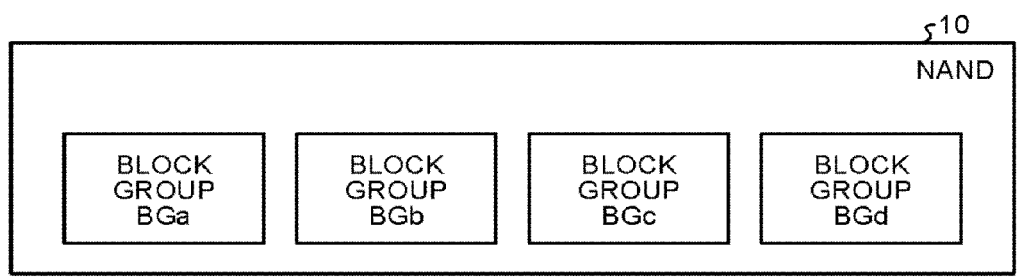
FIG. 8 is a diagram that illustrates a plurality of block groups.

Hereinafter, the process executed by the relocation unit 24 will be described in detail. FIG. 8 illustrates a plurality of block groups BGa, BGb, BGc, and BGd used for grouping a plurality of blocks arranged inside the NAND 10. In the case illustrated in FIG. 8, while blocks are grouped into four block groups, any other number of groups may be employed. The block group BGa is a block group having a first priority level of which the degree of wear is the lowest. The block group BGb is a block group having a second priority level of which the degree of wear is the second lowest. In addition, the block group BGc is a block group having a third priority level of which the degree of wear is the third lowest. The block group BGd is a block group having a fourth priority level of which the degree of wear is the highest.

Figure 9:
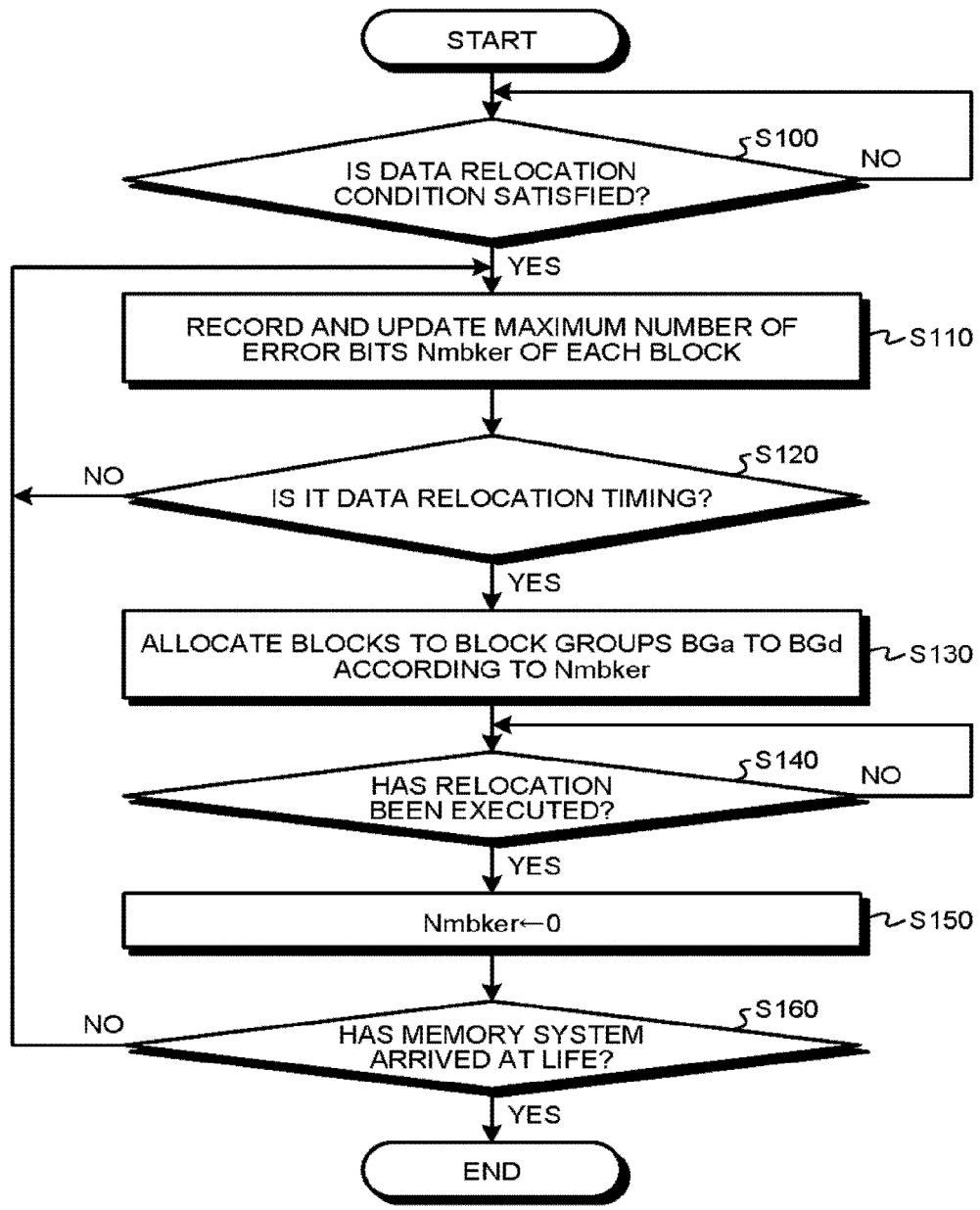
FIG. 9 is a flowchart that illustrates a block grouping process.

FIG. 9 is a flowchart that illustrates a first grouping sequence for blocks arranged inside the NAND 10. In the first block grouping sequence, after the data relocation conditions illustrated in FIGS. 3 to 5 are satisfied, the relocation unit 24 executes the grouping process for blocks. In the case illustrated in FIG. 3, in a case where the bit error rate (BER) exceeds the threshold C1, the data relocation condition is satisfied. In the case illustrated in FIG. 4, in a case where the number of bad blocks exceeds the threshold D1, the data relocation condition is satisfied. In the case illustrated in FIG. 5, in a case where the erasing time exceeds the threshold E1, the data relocation condition is satisfied.

In a case where the data relocation condition is satisfied (Yes in Step S100), the relocation unit 24 starts a process of registering and updating the maximum number of error bits Nmbker described above in the Nmbker management table illustrated in FIG. 7 (Step S110). The relocation unit 24 repeatedly executes this registration and update process until a predetermined cycle time Ta for the data relocating process elapses (the loop of Steps S110 and S120). As the cycle time Ta, for example, a time in which the memory system 100 is turned on may be counted, or the accumulated erase count described above may be counted. When the elapse of the cycle time Ta is detected, the relocation unit 24 compares the maximum number of error bits Nmbker of each block registered in the Nmbker management table with three thresholds G1 to G3 and allocates the block arranged inside the NAND 10 to one of the block groups BGa to BGd based on a result of the comparison (Step S130). Here, G1<G2<G3.

The relocation unit 24 allocates blocks each having Nmbker<G1 to the block group BGa. The relocation unit 24 allocates blocks each having G1≤Nmbker<G2 to the block group BGb. In addition, the relocation unit 24 allocates blocks each having G2≤Nmbker<G3 to the block group BGc. The relocation unit 24 allocates blocks each having G3≤Nmbker to the block group BGd. This allocation result is used for the data relocating process to be described later. When the data relocating process is completed (Yes in Step S140), the relocation unit 24 resets the Nmbker value registered in each entry of the Nmbker management table to zero (Step S150). The relocation unit 24 cyclically executes such a block grouping process at the period of the cycle time Ta until the memory system 100 arrives at the life (Yes in Step S160).

Figure 10:
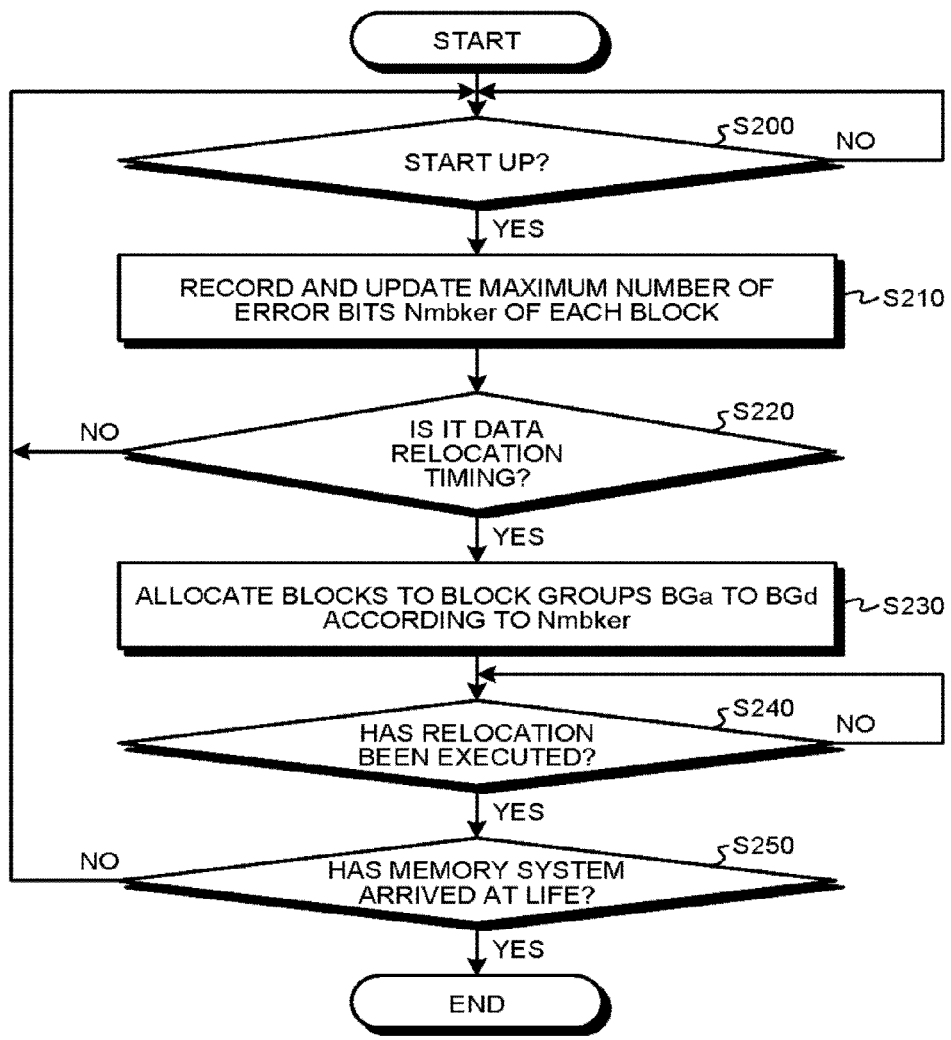
FIG. 10 is a flowchart that illustrates another block grouping process.

FIG. 10 is a flowchart that illustrates a second grouping sequence for blocks arranged inside the NAND 10. In the second block grouping sequence, the relocation unit 24 executes a grouping process for the blocks from the first operation of the memory system 100.

When the memory system 100 is operated (Yes in Step S200), the relocation unit 24 executes the above-described process of registering and updating the maximum number of error bits Nmbker in the Nmbker management table illustrated in FIG. 7 (Step S210). The relocation unit 24 repeatedly executes this registration and update process until the data relocating process of the first time is executed (the loop of Steps S200 to S220). The data relocating process of the first time may be configured to be executed when the data relocation condition illustrated in FIGS. 3 to 5 described above is satisfied or may be configured to be executed when the cycle time Ta elapses after the data relocation condition is satisfied.

When the data relocating process of the first time is executed, the relocation unit 24, as described above, compares the maximum number of error bits Nmbker of each block, which is registered in the Nmbker management table, with three thresholds G1 to G3 and allocates each block arranged inside the NAND 10 to one of the block groups BGa to BGd based on a result of the comparison (Step 3230). This allocation result is used for the data relocating process to be described later. When the data relocating process is completed (Yes in Step S240), the relocation unit 24 restarts the process of registering the Nmbker value in the Nmbker management table (Step S210). In addition, when the next cycle time Ta elapses (Yes in Step S220), the relocation unit 24 executes the block grouping process again (Step S230). Such a process is cyclically executed at the period of the cycle time Ta until the memory system 100 arrives at the life (Yes in Step S250).

In addition, between Steps S240 and S250, a process of resetting the Nmbker value registered in each entry of the Nmbker management table to zero may be added.

Figure 11:
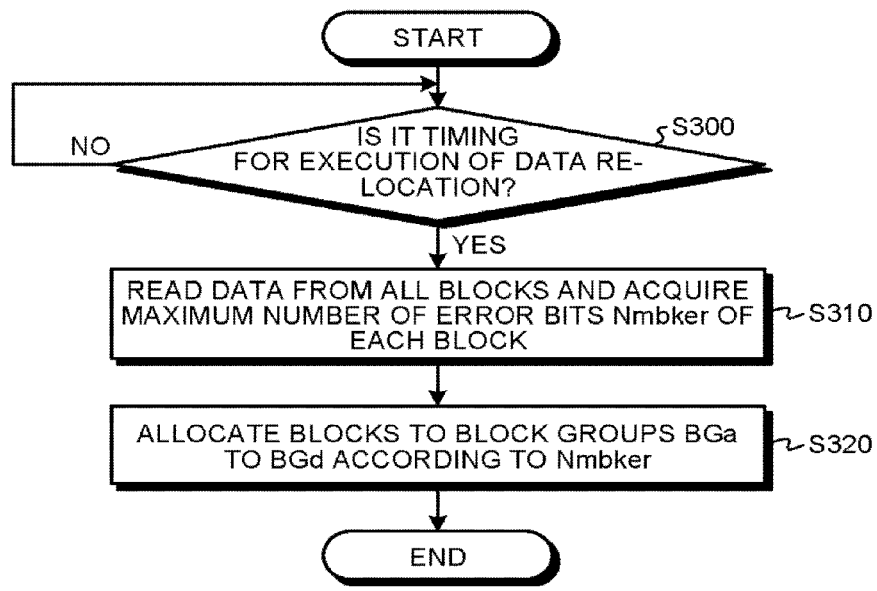
FIG. 11 is a flowchart that illustrates further another block grouping process.

FIG. 11 is a flowchart that illustrates a third grouping sequence for blocks arranged inside the NAND 10. In the third block grouping sequence, in a case where the data relocating process is executed, data is read and decoded from all the blocks arranged inside the NAND 10, and the maximum number of error bits Nmbker of all the blocks are calculated based on a result of the decoding process.

When the data relocating process of the first time described above is executed (Yes in Step S300), the relocation unit 24 reads data from all the blocks (active blocks and free blocks) arranged inside the NAND 10. At this time, after dummy data that is invalid is written into a free block, the relocation unit 24 reads data of the block. The ECC unit 23 decodes the read data and notifies the relocation unit 24 of the number of error bits Npger of each page that is a result of the decoding process. The relocation unit 24, as described above, calculates the maximum number of error bits Nmbker of all the blocks (Step S310). The relocation unit 24 compares the calculated maximum number of error bits Nmbker of each block with three thresholds G1 to G3 and allocates each block arranged inside the NAND 10 to one of the block groups BGa to BGd based on a result of the comparison (Step S320). This result of the assignment is used for the data relocating process to be described later. The relocation unit 24 cyclically executes such a block grouping process at the period of the cycle time Ta until the memory system 100 arrives at the life.

Figure 12:
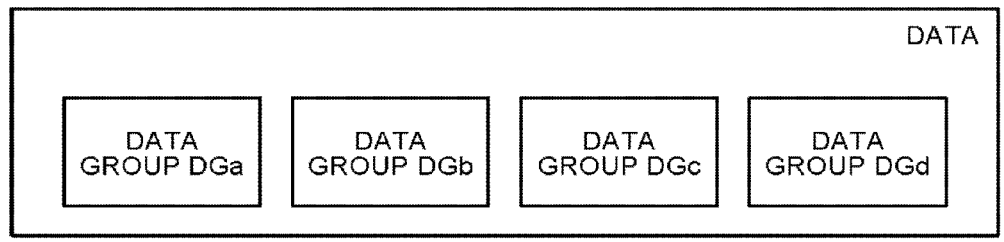
FIG. 12 is a diagram that illustrates a plurality of data groups.

FIG. 12 is a diagram that illustrates a plurality of data groups DGa, DGb, DGc, and DGd used for grouping user data stored in each block of the NAND 10. In the case illustrated in FIG. 12, while the user data is grouped into four data groups, any other number of groups may be employed. The data group DGa is a data group of a first priority level of which the access frequency is the highest. The data group DGb is a data group of a second priority level of which the access frequency is the second highest. In addition, the data group DGc is a data group of a third priority level of which the access frequency is the third highest. The data group DGd is a data group of a fourth priority level of which the access frequency is the lowest.

Figure 13:
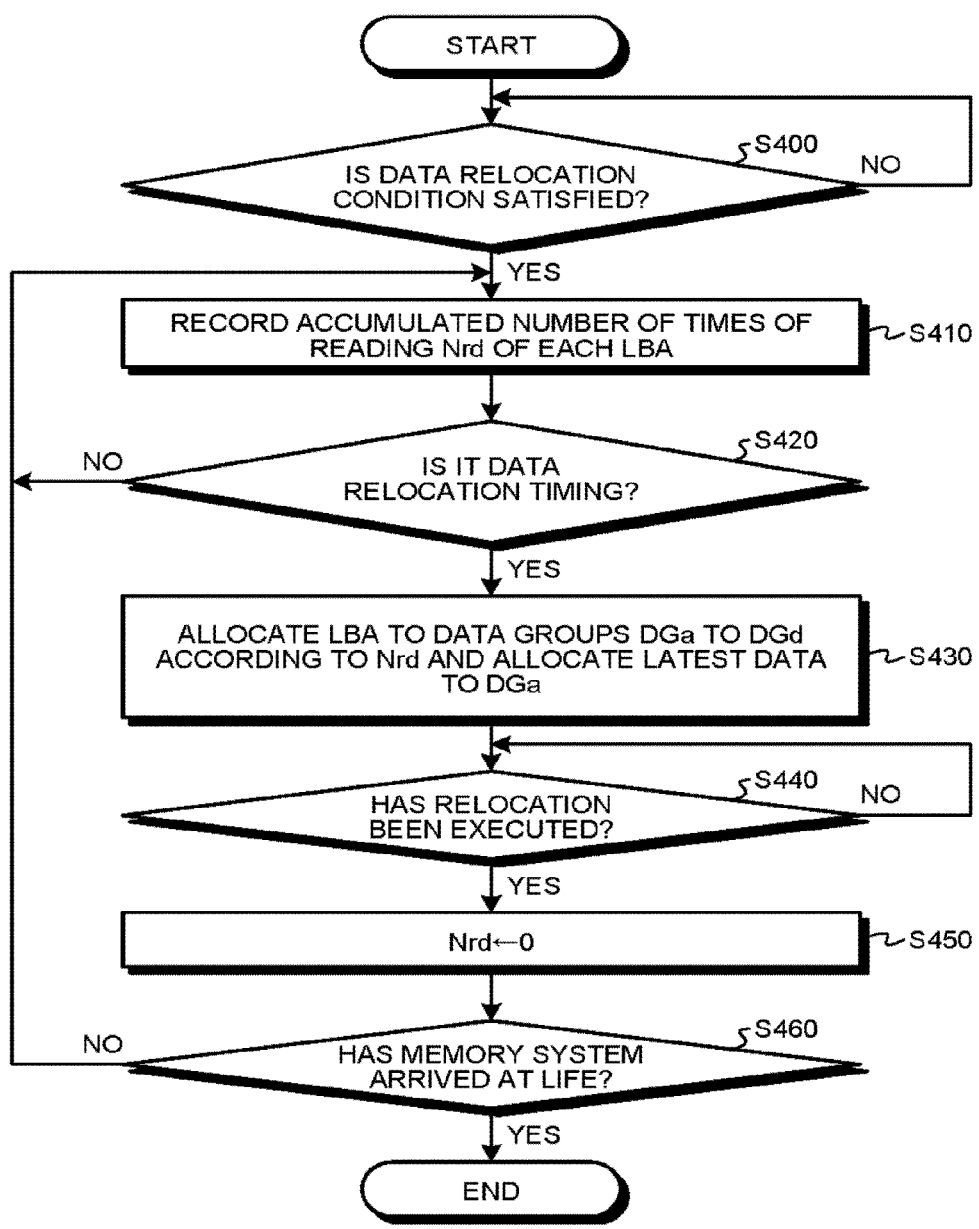
FIG. 13 is a flowchart that illustrates a data grouping process.

FIG. 13 is a flowchart that illustrates a first grouping sequence for data stored in the NAND 10. In the first data grouping sequence, after the data relocation condition illustrated in FIGS. 3 to 5 described above is satisfied, the relocation unit 24 executes the grouping process for the data.

In a case where the data relocation condition is satisfied (Yes in Step S400), the relocation unit 24 starts the process of registering and updating (counting up) the accumulated number of times Nrd of reading described above in the Nrd management table illustrated in FIG. 6 (Step S410). The relocation unit 24 repeatedly executes the process of registering and updating the Nrd value for the entry of each LBA of the Nrd management table until the cycle time Ta described above elapses (the loop of Steps S410 and S420).

When the elapse of the cycle time Ta is detected, the relocation unit 24 compares the accumulated read number of times Nrd of each LBA registered in the Nrd management table with three thresholds J1 to J3 and allocates corresponding data (LBA) stored in the NAND 10 to one of the data groups DGa to DGd based on a result of the comparison (Step S430). Here, $J1<J2<J3$.

The relocation unit 24 allocates each LBA having $J3 \leq Nrd$ to the data group DGa of the first priority level. The relocation unit 24 allocates each LBA having $J2 \leq Nrd < J3$ to the data group DGb of the second priority level. In addition, the relocation unit 24 allocates each LBA having $J1 \leq Nrd < J2$ to the data group DGc of the third priority level. The relocation unit 24 allocates each LBA having $Nrd < J1$ to the data group DGd of the fourth priority level.

Here, the relocation unit 24 allocate data lately accessed from the host 1 according to a read command or a write command to the data group DGa of the first priority level or the data group DGb of the second priority level regardless of the accumulated number of times Nrd of reading (Step S530). For this allocation, the relocation unit 24 records an LBA specified by the read command or the write command in an exceptional period TR from a time point a predetermined period Tb going back from timing at which data relocation is executed to the timing at which the data relocation is executed. The relocation unit 24 allocates the data group DGa of the first priority level or the data group DGb of the second priority level to the recorded LBA regardless of the accumulated number of times Nrd of reading. As the period Tb described above, for example, a period of 24 hours, one week, or the like is set. In addition, system data corresponding to a significant LBA of an operating system (OS), OS startup data used for starting up the OS, or the like may be configured to be allocated to the data group DGa of the first priority level regardless of the accumulated number of times Nrd of reading.

A result of the allocation executed in Step S430 is used for the data relocating process to be described later. When the data relocating process is completed (Yes in Step S440), the relocation unit 24 resets the Nrd value registered in each entry of the Nrd management table to zero (Step S150). The relocation unit 24 cyclically executes such a data grouping process at the period of the cycle time Ta until the memory system 100 arrives at the life (Yes in Step S460).

Figure 14:
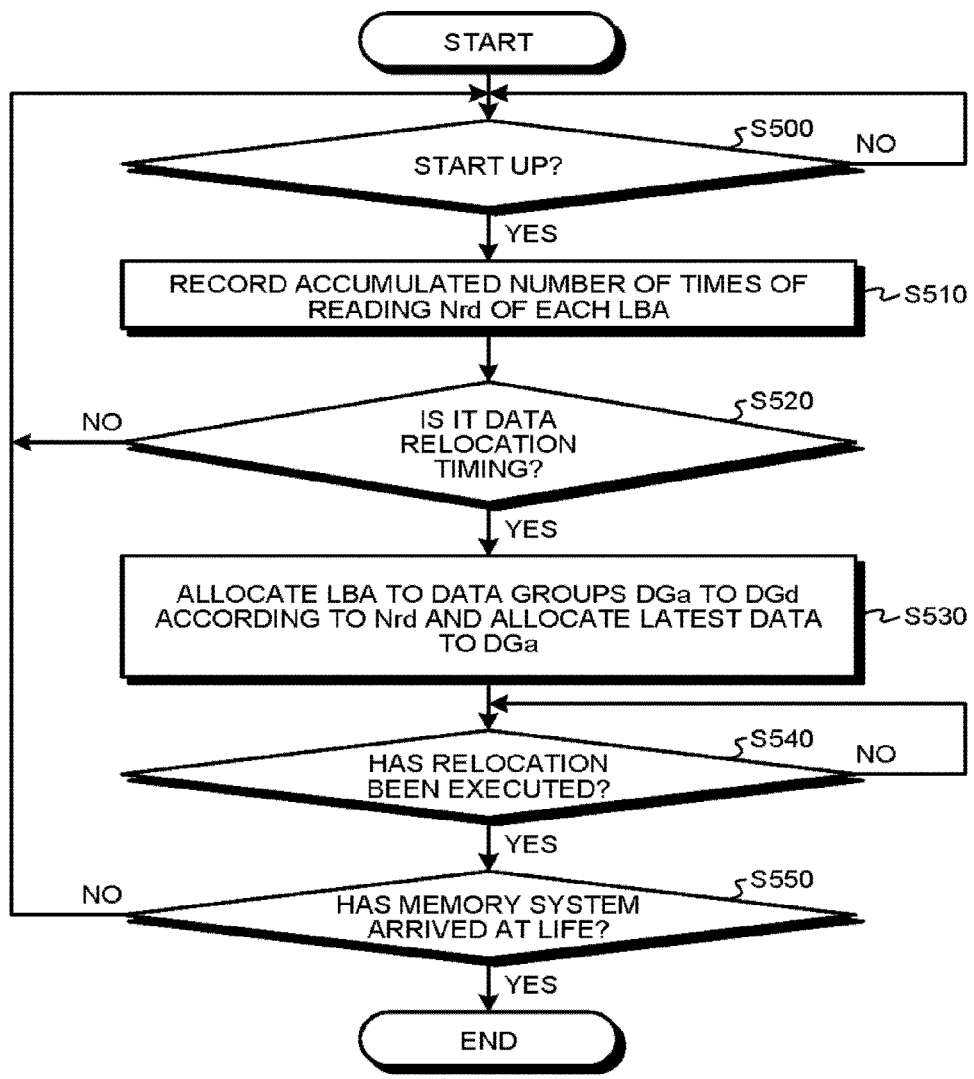
FIG. 14 is a flowchart that illustrates another data grouping process.

FIG. 14 is a flowchart that illustrates a second data grouping sequence for data stored in the NAND 10. In the second data grouping sequence, the relocation unit 24 executes the grouping process for the data from when the memory system 100 is operated for the first time.

When the memory system 100 is started to operate (Yes in Step S500), the relocation unit 24 executes the process of registering and updating (counting up) the above-described accumulated number of times Nrd of reading for the Nrd management table illustrated in FIG. 6 (Step S510). The relocation unit 24 repeatedly executes this registration and update process until the data relocating process of the first time is executed (the loop of Steps S500 to S520). The data relocating process of the first time, as described above, may be configured to be executed when the data relocation condition represented in FIGS. 3 to 5 described above is satisfied or may be configured to be executed when the cycle time Ta elapses after the data relocation condition is satisfied.

When the data relocating process of the first time is executed, the relocation unit 24, as described above, compares the accumulated read number of times Nrd of each LBA registered in the Nrd management table with three thresholds J1 to J3 and allocates each data stored in the NAND 10 to one of the data groups DGa to DGd based on a result of the comparison (Step S530). In addition, the relocation unit 24 allocates data lately accessed from the host 1 to the data group DGa of the first priority level or the data group DGb of the second priority level regardless of the accumulated number of times Nrd of reading. A result of the allocation is used for the data relocating process to be described later. When the data relocating process is completed (Yes in Step S540), the relocation unit 24 restarts the process of registering and updating process of the Nrd value in the Nrd management table (Step S510). In addition, when the next cycle time Ta elapses (Yes in Step S520), the relocation unit 24 executes the grouping process for the data (LBA) (Step S530). Such a process is cyclically executed at the period of the cycle time Ta until the memory system 100 arrives at the life (Yes in Step S550).

In addition, between Steps S540 and S550, the process of resetting the Nrd value registered in each entry of the Nrd management table to zero may be added.

Figure 15:
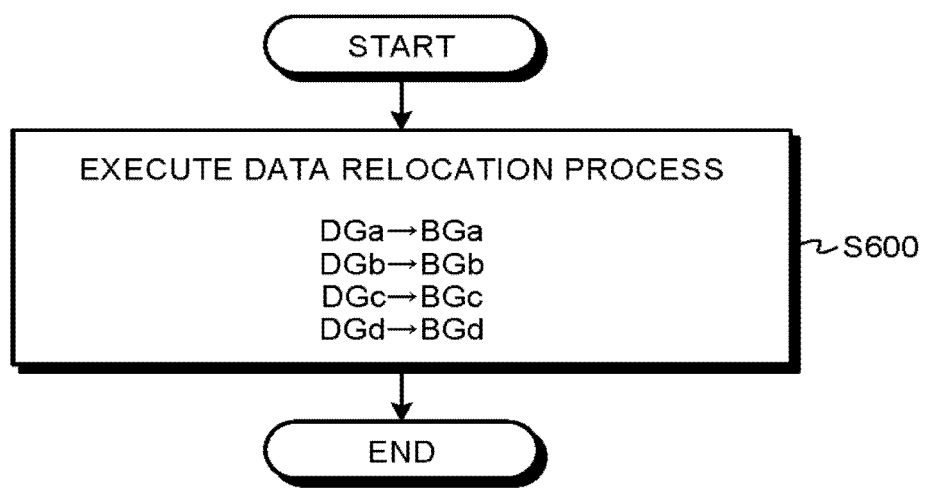
FIG. 15 is a flowchart that illustrates a data relocating process.

FIG. 15 is a diagram that illustrates the data relocating process. The relocation unit 24 executes the relocation of data based on the result of the block grouping and the result of the data grouping described above (Step S600). The relocation unit 24 reads data allocated to the data group DGa from a data movement source block of the NAND 10 into the RAM 30 and writes the read data into a block that is allocated to the block group BGa. The relocation unit 24 reads data allocated to the data group DGb from a data movement source block of the NAND 10 into the RAM 30 and writes the read data into a block that is allocated to the block group BGb. In addition, the relocation unit 24 reads data allocated to the data group DGc from a data movement source block of the NAND 10 into the RAM 30 and writes the read data into a block that is allocated to the block group BGc. The relocation unit 24 reads data allocated to the data group DGd from a data movement source block of the NAND 10 into the RAM 30 and writes the read data into a block that is allocated to the block group BGd. In accordance with the data movement, the relocation unit 24 updates management information of the logical/physical translation table, the block management table, and the like.

As above, according to the first embodiment, the data relocating process is executed in which data grouped into a data group having a high access frequency is rewritten into a block grouped into a block group having a low degree of wear, and data grouped into a data group having a low access frequency is rewritten into a block group grouped into a block group having a high degree of wear. Accordingly, in a case where the tolerance of each memory cell to rewriting has a variation between packages, chips, and blocks, the life of the NAND can be lengthened. In addition, a large decrease in the access speed perceived by the user can be prevented.

In addition, in this embodiment, while the "maximum number of error bits of a block" is used as an index of the degree of wear of the block in the description presented with reference to FIGS. 9 to 11, an "average number of error bits of the block", a "maximum BER of the block", or an "average BER of the block" may be used.

Furthermore, the accumulated number of error correction times Nter of a block may be used as the index of the degree of wear of the block. The accumulated number of error correction times Nter is an accumulated value of the number of times of the decoding process executed until the decoding process is successful. As described above, the ECC unit 23 has the first-level ECC section, the second-level ECC section, and the third-level ECC section that have mutually-different error correction capabilities. For example, the error correction number of times Ner is set to one in a case where the decoding process executed by the first-level ECC section is successful. The error correction number of times Ner is set to two in a case where the decoding processes executed by the first-level is failed and the decoding processes executed by the second-level ECC sections is successful. The error correction number of times Ner is set to three in a case where the decoding processes executed by the first-level and the second-level ECC sections are failed and the decoding processes executed by the third-level ECC sections is successful. The relocation unit 24 manages the accumulated number of error correction times Nter for each block ID. By accumulating the number of error correction times Ner for each block ID, the relocation unit 24 calculates the accumulated number of error correction times Nter. The number of error correction times Ner of a block, as described above, for example, is calculated based on an average, a maximum value, or a sum of the numbers of times of execution of an error correction of one or a plurality of sample pages arranged within the block.

Figure 16:
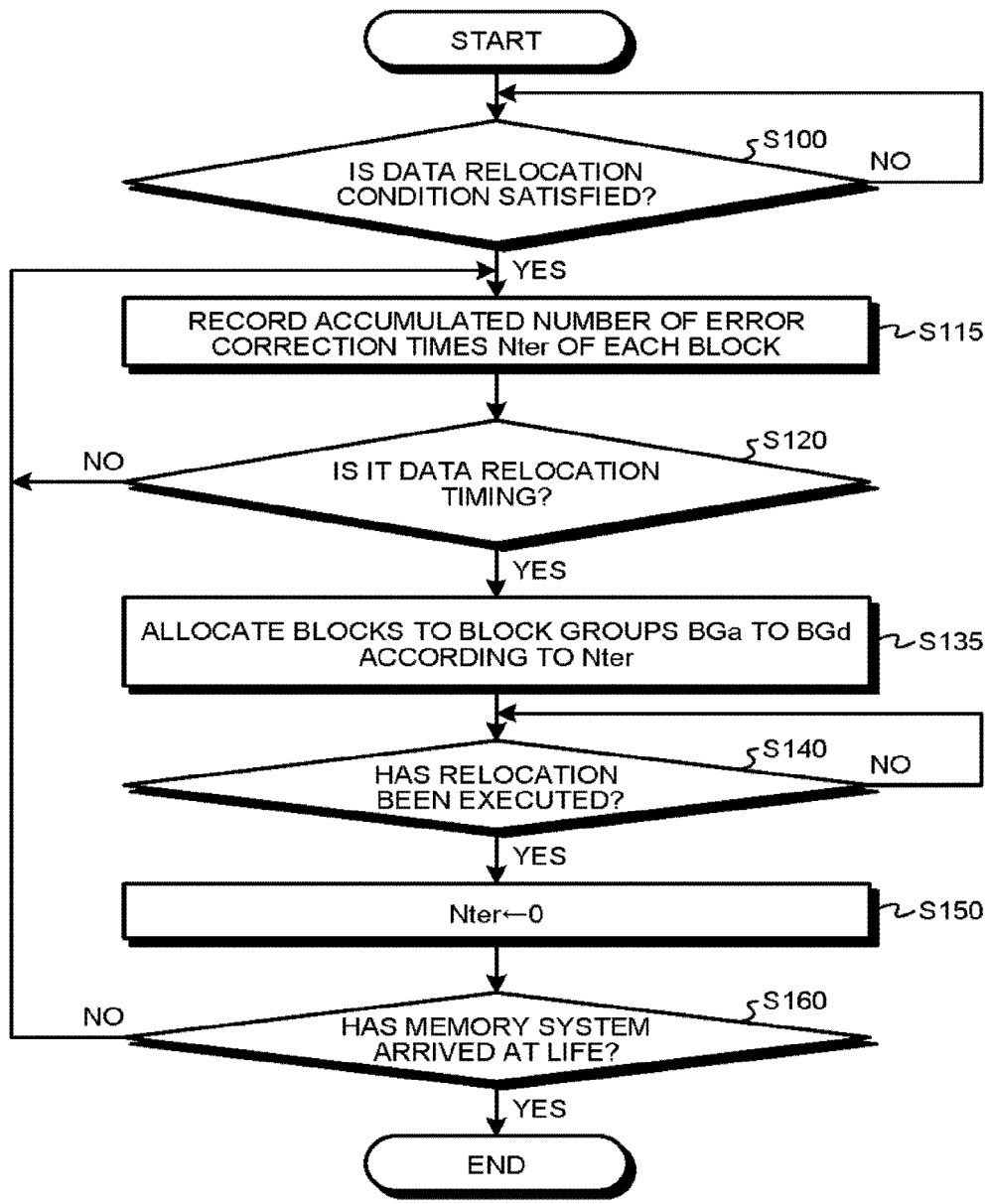
FIG. 16 is a flowchart that illustrates further another block grouping process.

FIG. 16 is a flowchart that illustrates a block grouping sequence using the accumulated number of error correction times Nter. In the case illustrated in FIG. 16, Step S110 illustrated in FIG. 9 is replaced with Step S115, and Step S130 illustrated in FIG. 9 is replaced with Step S135. In the case illustrated in FIG. 16, the block grouping process is executed by using the accumulated number of error correction times Nter, which is different from that illustrated in FIG. 9, and duplicate description will not be presented. The block grouping process illustrated in FIG. 10 or 11 may be executed by using the accumulated number of error correction times Nter.

In addition, in the embodiment described above, while data corresponding to all the LBAs is set as a target for data grouping with the accumulated number of times of reading Nrd being used as the index, the OS and significant data such as OS startup data used for operating the OS may be configured not to be a target for the data grouping using the accumulated number of times of reading Nrd but to be constantly set as data having the highest degree of priority.

Second Embodiment

A second embodiment will be described with reference to FIG. 1. Duplicate description of the function of each constituent element illustrated in FIG. 1 will not be presented. In the second embodiment, in a case where a multiplexing condition is satisfied, a multiplexing unit 25 multiplexes (duplexes) user data. The multiplexing unit 25 multiplexes data of a data group having a high access frequency with priority over data of a data group having a low access frequency by referring to a result of the data grouping process executed by a relocation unit 24.

Figure 17:
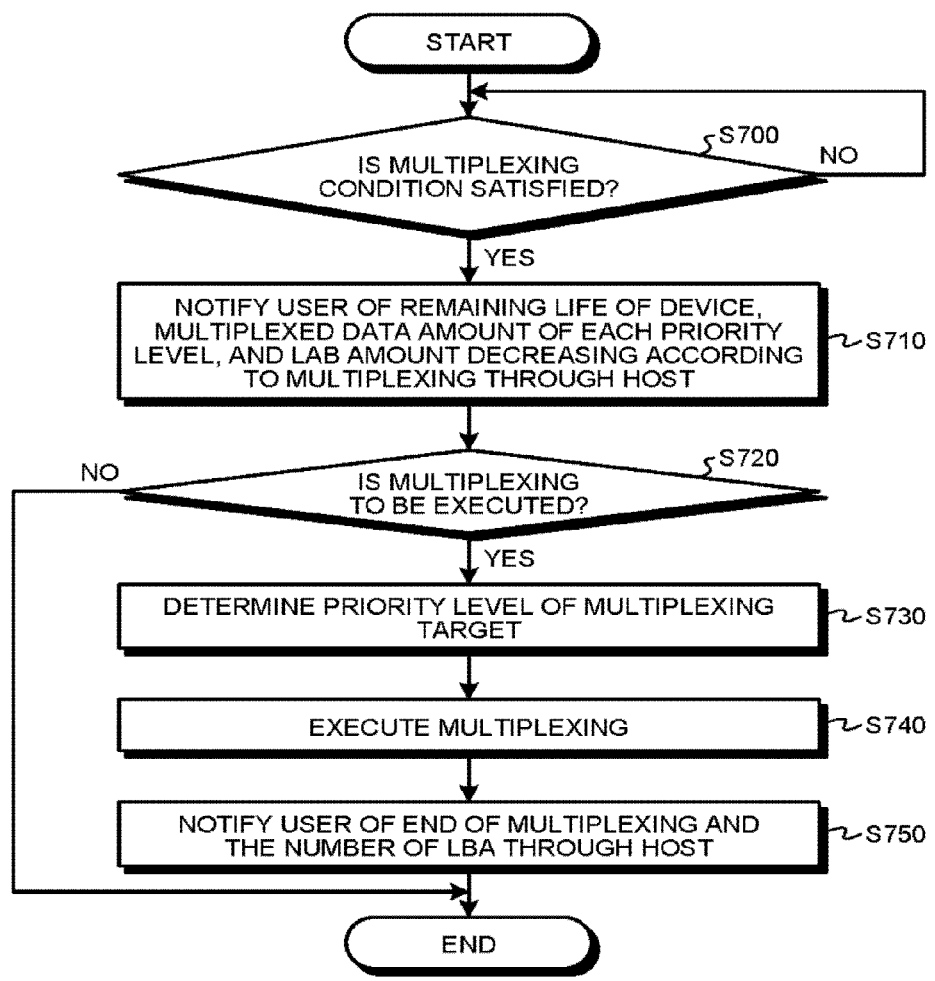
FIG. 17 is a flowchart that illustrates the sequence of a multiplexing process.

FIG. 17 is a flowchart that illustrates a multiplexing process sequence. The multiplexing unit 25 determines whether or not the multiplexing condition is satisfied (Step S700). The multiplexing unit 25, for example, as illustrated in FIGS. 3 to 5 described above, determines whether to start the multiplexing process based on the BER, the number of bad blocks, and the erasing time of a NAND 10. For example, as illustrated in FIG. 3, in a case where the BER of the NAND 10 exceeds a threshold C2, the multiplexing unit 25 starts the multiplexing process. In addition, as illustrated in FIG. 4, in a case where the number of bad blocks exceeds a threshold D2, the multiplexing unit 25 starts the multiplexing process. Furthermore, as illustrated in FIG. 5, in a case where the erasing time exceeds a threshold E2, the multiplexing unit 25 starts the multiplexing process.

In a case where the multiplexing condition is satisfied, the multiplexing unit 25 calculates a parameter that is necessary for the multiplexing process. The multiplexing unit 25 calculates the remaining life of the NAND 10. The remaining life is calculated by using the accumulated erase count or the BER of the NAND 10 and the like. For example, the remaining life is calculated based on the current value of the accumulated erase count and an assumed accumulated erase count at the time of arrival at the life.

The multiplexing unit 25 calculates a current valid data amount Cda of data stored in the NAND 10 and a vacant capacity Cde of the NAND 10 based on the logical/physical translation table and the like. The vacant capacity Cde is calculated by subtracting the current valid data amount Cda from a user capacity of the NAND 10. The multiplexing unit 25 compares the valid data amount Cda with the vacant capacity Cde and calculates a data amount Ddm that can be multiplexed. In addition, the multiplexing unit 25 allocates data stored within the data groups as multiplexing candidate data in order (order of DGa, DGb, DGc, and DGd) of highest to lowest priority level by referring to the current data grouping result acquired by the relocation unit 24. For example, in a case where data stored in the data groups DGa and DGb can be allocated as multiplexing candidate data, data stored in the data groups DGa and DGb is set as multiplexing candidate data. On the other hand, in a case where data stored in all the data groups DGa to DGd can be allocated as multiplexing candidate data, data stored in all the data groups DGa to DGd is set as multiplexing candidate data.

The multiplexing unit 25 calculates a decreased number of LBA in other words a decreased user capacity of a case where the multiplexing candidate data is multiplexed. For example, in a case where the number of LBA is to be calculated in units of bytes, the number of LBA is a value acquired by dividing the user capacity by one byte. The multiplexing unit 25 calculates a decreased number of LBA for each priority level of the multiplexing candidate data. For example, in a case where the data stored in the data groups DGa and DGb can be set as multiplexing candidate data, a decreased number of LBA of a case where the data group DGa is multiplexed and a decreased number of LBA of a case where the data groups DGa and DGb are multiplexed are calculated. In addition, in a case where the data stored in the data groups DGa to DGd can be set as multiplexing candidate data, for example, a decreased number of LBA of a case where the data groups DGa is multiplexed, a decreased number of LBA of a case where the data groups DGa and DGb are multiplexed, a decreased number of LBA of a case where the data groups DGa to DGc are multiplexed, and a decreased number of LBA of a case where the data groups DGa to DGd are multiplexed are calculated.

Next, the multiplexing unit 25 notifies the user of the following information through the host 1 (Step S710).
  (a) Remaining life
  (b) Multiplexed data amount for each priority level
  (c) Decreased LBA amount according to multiplexing As the information of (b), the user is notified of the data amount of the multiplexing candidate data for each priority level. For example, the user is notified of a data amount of data having the first priority level, a data amount of data having the second priority level, and the like. As the information of (c), the user is notified of the decreased number of LBA for each priority level.

The user views such a notification and selects whether to perform multiplexing or not and the priority level up to which the data is multiplexed. The memory system 100 is notified of a result of the selection through the host 1. The multiplexing unit 25 determines whether or not the multiplexing process is executed based on the result of the user's selection (Step S720). In addition, the multiplexing unit 25 determines the priority level up to which the multiplexing candidate is multiplexed among the multiplexing candidate data based on the result of the user's selection (Step S730). Next, the multiplexing unit 25 executes the multiplexing process based on the result of the user's selection (Step S740). In this multiplexing process, data selected by the user is copied to a free block of the NAND 10. In addition, it is preferable that data is written in the SLC mode for a free block that is a copy destination. When the multiplexing process is completed, the multiplexing unit 25 acquires the number of LBA number that has actually decreased according to the multiplexing process and acquires a number of LBA by subtracting the decreased number of LBA from the number of LBA corresponding to the user capacity. In addition, the multiplexing unit 25 acquires a user capacity based on the acquired the number of LBA and updates the number of LBA and the user capacity.

The multiplexing unit 25 notifies the user of the end of the multiplexing process, the number of LBA after multiplexing or the user capacity after multiplexing through the host 1 (Step S750).

As above, in the second embodiment, since the multiplexing process in which data having a high access frequency has the priority is executed, the reliability of data can be improved.

In addition, the decreased number of LBA may be configured to be calculated by the host 1. In such a case, the memory system 100 notifies the host 1 of "(a) remaining life" and "(b) multiplexed data amount for each priority level". The host 1 calculates the decreased number of LBA for each priority level based on the number of LBA corresponding to the current user capacity and "(b) multiplexed data amount for each priority level".

In addition, also after a notification of no execution of the multiplexing process is given by the user, a notification of execution/no-execution of the multiplexing process may be configured to be regularly given to the user. Furthermore, a backup area may be separately arranged in the NAND 10 in addition to the user capacity. In such a case, the multiplexing process described above may be configured to be executed by using the backup area. In addition, another storage medium other than the NAND 10 may be used for the backup area. Furthermore, the memory controller 2 may be configured to be to access the backup area only in a case where the multiplexing process described above is executed or a case where data stored through the execution of the multiplexing process is written back from the backup area to the NAND 10. In addition, after the multiplexing process described above, only in a case where the error of data stored in the NAND 10 that is the multiplexing target cannot be corrected by the ECC unit 23, the memory controller 2 may be configured to write back multiplexed data of the data of which the error cannot be corrected from the backup area to the NAND 10.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory that includes a plurality of blocks;
a backup area, and
a controller configured to
group data stored in the nonvolatile memory into a plurality of data groups based on a first value, the first value corresponding to an access frequency or a number of access times for the data from a host; and
group the plurality of blocks into a plurality of block groups based on a second value, the second value corresponding to a degree of wear of each of the blocks; and
write data stored in a first data group of the plurality of data groups into a first block group of the plurality of block groups and write data stored in a second data group of the plurality of data groups into a second block group of the plurality of block groups in a case where a second condition is satisfied, and
in a case where a first condition is satisfied, notify information to the host, the information including a vacant capacity of the nonvolatile memory, priority levels of the plurality of data groups, and a user capacity of the nonvolatile memory, the user capacity decreasing according to data multiplexing, the data multiplexing including copying multiplexing target data from a first area of the nonvolatile memory to a second area of the nonvolatile memory,
wherein the controller, in a case where the data multiplexing is determined to be executed, writes data included in the first data group among the plurality of data groups into the backup area and, in a case where an error of data grouped into the first data group cannot be corrected, writes the data stored in the backup area into the blocks.

2. The memory system according to claim 1, wherein the controller determines whether or not the first condition is satisfied based on at least one of a bit error rate, a number of bad blocks, and an erasing time.

3. The memory system according to claim 2, wherein the controller determines whether data multiplexing is to be executed based on a response from the host that corresponds to the notification to the host and, in a case where the data multiplexing is determined to be executed, changes the user capacity of the nonvolatile memory and writes data included in a first data group among the plurality of data groups into the blocks.

4. The memory system according to claim 3, wherein the controller notifies a valid capacity of the nonvolatile memory to the host after completion of the data multiplexing.

5. The memory system according to claim 1, wherein the controller determines whether or not the second condition is satisfied based on at least one of a bit error rate, a number of bad blocks, and an erasing time.

6. The memory system according to claim 1, wherein the first value of the first data group is larger than the first value of the second data group, and the second value of the first block group is smaller than the second value of the second block group.

7. The memory system according to claim 6, wherein the first value of the first data group is the largest among the first values of the plurality of data groups, the second value of the first block group is the smallest among the second values of the plurality of block groups, the first value of the second data group is the smallest among the first values of the plurality of data groups, and the second value of the second block group is the largest among the second values of the plurality of block groups.

8. The memory system according to claim 1, wherein the second value is the maximum number of error bits among a plurality of the number of error bits corresponding to a plurality of pages included in the block.

9. The memory system according to claim 1, wherein the second value is an accumulated value of the number of error correction times of the block.

10. The memory system according to claim 1, wherein the first value is a number of times of reading based on a request from the host.

11. The memory system according to claim 6, wherein, in a case where the second condition is satisfied when a certain period elapses since writing to the first block group and writing to the second block group, the controller is configured to write data stored in a third data group of the plurality of data groups into a third block group of the plurality of block groups and write data stored in a fourth data group of the plurality of data groups into a fourth block group of the plurality of block groups, the first value of the third data group being larger than the first value of the fourth data group, the second value of the third block group being smaller than the second value of the fourth block group.

12. A method for controlling a nonvolatile memory including a plurality of blocks, the method comprising:
grouping data stored in the nonvolatile memory into a plurality of data groups based on a first value, the first value corresponding to an access frequency or a number of access times for the data from a host; and
grouping the plurality of blocks into a plurality of block groups based on a second value, the second value corresponding to a degree of wear of each of the blocks; and
writing data stored in a first data group of the plurality of data groups into a first block group of the plurality of block groups and writing data stored in a second data group of the plurality of data groups into a second block group of the plurality of block groups in a case where a second condition is satisfied, and
in a case where a first condition is satisfied, notifying information to the host, the information including a vacant capacity of the nonvolatile memory, priority levels of the plurality of data groups, and a user capacity of the nonvolatile memory, the user capacity decreasing according to data multiplexing, the data multiplexing including copying multiplexing target data from a first area of the nonvolatile memory to a second area of the nonvolatile memory,
further comprising, in a case where the data multiplexing is determined to be executed, writing data included in the first data group among the plurality of data groups into the backup area and, in a case where an error of data grouped into the first data group cannot be corrected, writing the data stored in the backup area into the blocks.

13. The method according to claim 12, further comprising determining whether or not the first condition is satisfied based on at least one of a bit error rate, a number of bad blocks, and an erasing time.

14. The method according to claim 13, further comprising determining whether data multiplexing is to be executed based on a response from the host that corresponds to the notification to the host and, in a case where the data multiplexing is determined to be executed, changing the user capacity of the nonvolatile memory and writing data included in a first data group among the plurality of data groups into the blocks.

15. The method according to claim 14, further comprising notifying a valid capacity of the nonvolatile memory to the host after completion of the data multiplexing.

16. The method according to claim 12, further comprising determining whether or not the second condition is satisfied based on at least one of a bit error rate, a number of bad blocks, and an erasing time.

* * * * *